(12) United States Patent
Shen

(10) Patent No.: US 10,775,214 B2
(45) Date of Patent: Sep. 15, 2020

(54) INSERTION TYPE ULTRASONIC FLOW METER, FLOW MEASURING SYSTEM AND METHOD

(71) Applicant: Spire Metering Technology LLC, Marlborough, MA (US)

(72) Inventor: Chang Shen, Acton, MA (US)

(73) Assignee: Spire Metering Technology LLC, Marlborough, MA (US)

( * ) Notice: Subject to any disclaimer, the term of this patent is extended or adjusted under 35 U.S.C. 154(b) by 0 days.

(21) Appl. No.: 16/190,607

(22) Filed: Nov. 14, 2018

(65) Prior Publication Data
US 2020/0149940 A1 May 14, 2020

(51) Int. Cl.
*G01F 1/66* (2006.01)
*G01N 29/02* (2006.01)
*G01N 29/024* (2006.01)

(52) U.S. Cl.
CPC ........... *G01F 1/667* (2013.01); *G01N 29/024* (2013.01); *G01N 2291/02836* (2013.01); *G01N 2291/02872* (2013.01); *G01N 2291/02881* (2013.01)

(58) Field of Classification Search
CPC ..... G01F 1/46; G01F 1/42; G01F 1/44; G01F 1/66
See application file for complete search history.

(56) References Cited

U.S. PATENT DOCUMENTS

| | | | | |
|---|---|---|---|---|
| 6,973,842 B1 * | 12/2005 | Feller | ...... | G01F 1/662 73/597 |
| 7,044,000 B2 * | 5/2006 | Feller | ...... | G01F 1/66 73/597 |
| 7,568,398 B2 * | 8/2009 | Feller | ...... | G01F 1/662 73/861.29 |
| 7,870,793 B1 * | 1/2011 | Feller | ...... | G01F 1/667 73/861.27 |
| 10,066,980 B2 * | 9/2018 | Heath | ...... | G01S 13/88 |

* cited by examiner

*Primary Examiner* — Jewel V Dowtin
(74) *Attorney, Agent, or Firm* — Kriegsman & Kriegsman

(57) ABSTRACT

This invention provides an insertion type ultrasonic flow meter, flow measuring system and method, which related to the field of flow measuring and metering. The insertion type ultrasonic flow meter includes a first insertion type sensor and a second insertion type sensor. The first insertion type sensor is equipped with a first ultrasonic transducer; the second insertion type sensor is equipped with a second ultrasonic transducer. The first insertion type sensor and the second insertion type sensor are installed at upstream and downstream of the pipeline respectively. The first ultrasonic transducer and the second ultrasonic transducer are equipped face-to-face. Compared to current technology, the insertion type ultrasonic flow meter provided by this invention has better signal receiving capability and smaller channel noise, therefore lower power consumption that can be powered with battery. It can also conduct accurate measurement to low velocity and flow rate of water in pipeline.

11 Claims, 5 Drawing Sheets

INSERTION TYPE ULTRASONIC FLOW METER, FLOW MEASURING SYSTEM AND METHOD

FIELD OF THE INVENTION

This invention involves the field of flow monitoring, specifically, an insertion type ultrasonic flow meter, flow measuring system and method.

BACKGROUND OF THE INVENTION

With the increasing shortage of water resources and increasing standards of energy conservation and emission reduction, accurate water metering and efficient management of systems for water supply have become one of the urgent tasks of current water industry. According to statistics, the average losses in water from leakage of general cities are around 20% to 30%, which is a great loss in resource and energy. To minimize this loss, flow meters should be installed in water supply pipelines to monitor the flow rate and pressure of pipe networks live. However, most pipe networks have been laid and run for many years. It requires cutting off water supply and cutting existing pipelines to install flow cell type flow meters or water meters, also with higher project costs. So flow cell type flow meters or water meters have their limitations in practical applications.

In recent years, DMA, District Metering Areas, method has been receiving attentions in urban water leak detections. However, in practical, it is found that the costs of flow cell type flow meters or water meters increase rapidly as the pipe sizes increase, which leads to a decrease in the amount of meters installed by urban water supply companies. This increases the areas of districts for leak detection, which also decreases the efficiency and accuracy of leak detection.

Insertion type ultrasonic flow meter does not require cutting pipelines or cutting off water supply and can be installed hot fast and easily. Moreover, the cost does not change a lot with pipe size. Therefore getting wide attentions.

The main types of existing insertion type flow meters are mechanical, electromagnetic and ultrasonic. Insertion type mechanical flow meters are traditional mechanical flow instruments, e.g. propeller flow meter, turbine flow meter, etc., inserted and installed inside pipeline. This type of flow meter has the common weaknesses of mechanical flow meter, which is easy to wear, blocked or jammed, high starting flow, low accuracy, etc. Thus there are many limitations in practical applications making it difficult to take accurate measurement or to detect leakage in pipe network.

Insertion type electromagnetic flow meter has the advantages of no moving part, low maintenance cost and battery powered. However, because it can be easily affected by electromagnetic environment and fluid conductivity, in addition to its bad performance at low flow velocity and high cost, it is not widely used.

Insertion type ultrasonic flow meter has the advantages of no moving part and low maintenance cost. It usually uses a pair of transducers, which are installed on both sides of the pipe, face-to-face, or on the same side of the pipe with a certain distance from each other. The transducers are usually flush with or near the inner wall of the pipe. So, during measurement, the signals need to travel a long distance, such as once or twice the pipe diameter, causing a large sound attenuation. This requires stronger transmit power, more complex weak signal detection and processing calculations. So the system power consumption is generally too high to be powered by battery. Because there is usually no external power available at the locations in urban pipeline where flow meters need to be installed, it is not practical to use meters without battery power.

Moreover, due to the strong noise in received signal, it is difficult for insertion type ultrasonic flow meter to measure low flow velocity, making leak detection impossible.

Furthermore, during the installation process, the relative distance of the sensor needs to be adjusted according to the actual situation in order to achieve the best received signal strength. Therefore, the system zero cannot be accurately defined, affecting the measurement results.

In summary, there is currently not a better flow meter can be installed easily and work reliably, has a low maintenance cost and reasonable price, meanwhile can be powered by battery and measure low flow velocity. Especially the latter two are very important for practical applications. Because most of the water pipelines are unable or not easy to get the urban power, power supply of flow meter is a very important issue. On the other hand, water leakages are slow leaks with a low flow velocity at early stages. But because the large diameter of pipe network, the amount of water leakage is not small. Thus, the low flow velocity performance of flow meter is very important to water leakage detection.

SUMMARY OF THE INVENTION

The purpose of this invention is to provide an insertion type ultrasonic flow meter, flow measuring system and method which can improve the issues above effectively.

Embodiments of the present invention are implemented as such:

First, an embodiment of present invention provides an insertion type ultrasonic flow meter applied to pipeline. The insertion type ultrasonic flow meter comprises a first insertion type sensor and a second insertion type sensor, where the first insertion type sensor is equipped with a first ultrasonic transducer; the second insertion type sensor is equipped with a second ultrasonic transducer. The first insertion type sensor and the second insertion type sensor are installed at upstream and downstream of the pipeline respectively. The first ultrasonic transducer and the second ultrasonic transducer are installed face to face.

In a preferred embodiment of the invention, the first insertion type sensor and the second insertion type sensor have rigid connection with fixed relative position, which ensure the sensor zero, meter factor and system performance of the insertion type ultrasonic flow meter are fixed and will not change due to installation.

In a preferred embodiment of the invention, the first insertion type sensor is equipped with multiple ultrasonic transducers at different heights in the pipeline; the second insertion type sensor is equipped with same amount of multiple ultrasonic transducers at same positions corresponding to the first insertion type sensor, so that each pair of ultrasonic transducers at the same positions of the first insertion type sensor and the second insertion type sensor form an ultrasonic channel, where the straight line each ultrasonic channel is located is parallel to the central axis of the pipeline.

In a preferred embodiment of the invention, the insertion type ultrasonic flow meter comprises a first hot tapping saddle and a second hot tapping saddle, where the first insertion type sensor is connected and fixed to the pipeline through the first hot tapping saddle; the second insertion type sensor is connected and fixed to the pipeline through the second hot tapping saddle.

In a preferred embodiment of the invention, the insertion type ultrasonic flow meter comprises a saddle connector, by which the first hot tapping saddle and the second hot tapping saddle are connected and fixed.

In a preferred embodiment of the invention, both the first hot tapping saddle and the second hot tapping saddle are equipped with an axial indicator, where the axial indicator is parallel to the central axis of the pipeline.

In a preferred embodiment of the invention, both the first insertion type sensor and the second insertion type sensor have scales or grooves so that the first insertion type sensor and the second insertion type sensor are inserted into the pipeline at same depth.

In a preferred embodiment of the invention, the insertion type ultrasonic flow meter comprises a first ball valve and a second ball valve, where the first ball valve is connected and fixed to the first hot tapping saddle through thread or flange; the second ball valve is connected and fixed to the second hot tapping saddle through thread or flange. The inner diameters of the first ball valve and the first hot tapping saddle are larger than the inner diameter of the first insertion type sensor; the inner diameters of the second ball valve and the second hot tapping saddle are larger than the inner diameter of the second insertion type sensor.

In a preferred embodiment of the invention, the insertion type ultrasonic flow meter comprises a first rod locking piece and a second rod locking piece, where the first insertion type sensor is connected and fixed by the first rod locking piece and the first ball valve; the second insertion type sensor is connected and fixed by the second rod locking piece and the second ball valve.

Second, an embodiment of present invention provides a flow measuring system, comprising the insertion type ultrasonic flow meter described above, time difference measuring unit, reference time unit, microcontroller unit MCU, LCD/Buttons unit, interface unit INTF, external data storage unit DL, real time clock unit RTC, and power management unit PMU. The time difference measuring unit and the microcontroller unit MCU are connected respectively to the insertion ultrasonic flow meter. The reference time unit and the microcontroller unit MCU are connected respectively to the time difference measuring unit. The LCD/Buttons unit, the interface unit INTF, the external data storage unit DL, the real time clock unit RTC and the power management unit PMU are connected respectively to the microcontroller unit MCU. The time difference measuring unit is also equipped with multichannel transfer switch at sensor accessing terminal.

In a preferred embodiment of the invention, the flow measuring system comprises a temperature sensor, a pressure sensor, a temperature measuring unit TMP and a pressure measuring unit P. The temperature sensor is located on the first insertion type sensor and the second insertion type sensor of the insertion type ultrasonic flow meter; the temperature measuring unit TMP is connected to the time difference measuring unit. The pressure sensor is located on the first insertion type sensor and the second insertion type sensor of the insertion type ultrasonic flow meter; the pressure measuring unit P is connected to the microcontroller unit MCU.

Third, an embodiment of present invention provides a flow measuring method, applied to the flow measuring system described above, comprising obtaining transit time of ultrasonic signal from upstream to downstream tdn and transit time of ultrasonic signal from downstream to upstream tup; obtaining the transit time difference dt between tdn and tup; obtaining the travel distance of ultrasonic signal from upstream to downstream or from downstream to upstream L, and calculating flow velocity at transducer $V=L/(tup*tdn)*dt$, average velocity of cross-section $Va=Ki*Kp*V$, pipeline flow rate $Q=\pi*R2*Va$, where Kp is flow rate profile factor, Kc is meter scale factor and R is radius of pipeline.

The insertion type ultrasonic flow meter, flow measuring system and method provided by the embodiments of present invention can form a flow velocity measuring ultrasonic channel that adjust position and spacing as needed, by installing the first insertion type sensor and the second insertion type sensor at upstream and downstream of the pipeline respectively and installing the first ultrasonic transducer and the second ultrasonic transducer on the first insertion type sensor and the second insertion type sensor respectively. Both ends of the ultrasonic channel are located at the same height in the pipeline, making transmission quality of the ultrasonic signal higher, which makes it convenient to accurately measure the point flow velocity at the same height inside pipeline. Compared with the prior art, the insertion type ultrasonic flow meter provided by the present invention has stronger signal receiving capability and less channel noise, which greatly simplify the hardware structure of flow meter and decrease the system power consumption, so it can be powered by battery. Meanwhile, because of better signal quality, the system has higher accuracy on measurement of ultrasonic transit time. Also, because the first ultrasonic transducer and the second ultrasonic transducer are installed face to face, the accuracy and low flow velocity measuring capability of the flow measuring system are guaranteed to achieve accurate measurement of low flow velocity and flow rate of water in pipeline.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

To describe the technical solutions of embodiments of present invention more clearly, a brief introduction of the drawings in the embodiments will be described below. It should be understood that the following drawings merely illustrate certain embodiments of the invention, therefore should not be considered as limitation of the scope. A person having ordinary skill in the art can also obtain other relevant drawings from these drawings without creative work.

Figure 1:
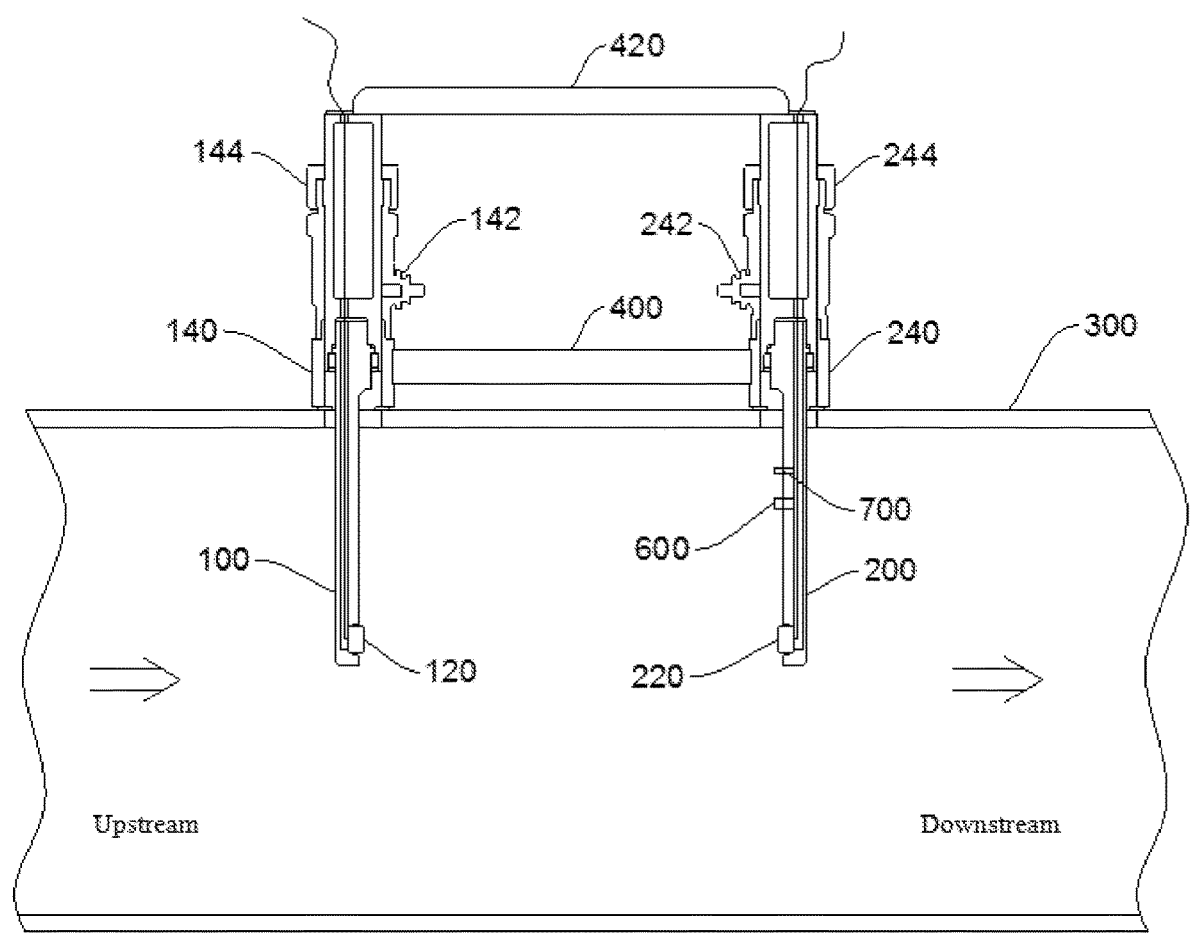
FIG. 1 is a schematic of the insertion type ultrasonic flow meter provided by the first embodiment of present invention.

Legend: 100—first insertion type sensor; 120—first ultrasonic transducer; 140—first hot tapping saddle; 142—first ball valve; 144—first rod locking piece; 200—second insertion type sensor; 220—second ultrasonic transducer; 240—second hot tapping saddle; 242—second ball valve; 244—second rod locking piece; 300—pipeline; 400—lower connecting beam; 420—upper connecting beam; 500—temperature sensor; 600—pressure sensor; 700—time difference measuring unit.

DETAILED DESCRIPTION OF THE INVENTION

To make the purpose, technical solutions and advantages of the embodiments of present invention clearer, the drawings of the embodiments of present invention will be used to make clear and complete description the technical solutions of the embodiments of the present invention. Obviously, the described embodiments are part of the embodiments of the invention, not all of the embodiments. Usually, the components of the embodiments of the invention described and illustrated in the drawings herein may be arranged and designed in a variety of different configurations.

Therefore, the following detailed description of the embodiments of present invention provided by the drawings are not intended to limit the scope of the claims, but merely to show selected embodiments of present invention. All other embodiments obtained by a person having ordinary skill in the art without creative work based on the embodiments of present invention all fall in the scope of present invention.

It should be noted that similar numbers and letters indicate similar items in the following drawings. Therefore, once an item is defined in a drawing, it is not required to be further defined and explained in subsequent drawings.

It should be noted that in the description of present invention, terms such as "mid", "up", "down", "left", "right", "inside", "outside", etc. used to indicate directions or locations are based on the directions or locations in the drawings, or usual directions or locations of the present invention when used, only for the convenience of describing the present invention, rather than indicating or implying the device or component have to have specific orientation or be constructed and operated in specific orientation. Therefore, it cannot be understood as a limitation on the present invention. In addition, terms such as "first", "second", "third", etc. are used only to distinguish descriptions, but not to indicate or imply relative importance.

Moreover, terms "horizontal", "vertical", "pendent", etc. do not mean that the component is required to be absolutely horizontal or vertical, but can be tilted slightly. For example, "horizontal" only indicate the orientation is more horizontal than "vertical", not absolute horizontal and can be tilted slightly.

It should also be noted that in the description of present invention, unless otherwise clearly stated and defined, terms "equip", "install", "connect", etc. should be comprehended generally. For example, it could be fixed connection, detachable connection, or integral connection; could be mechanical connection or electrical connection; could be direct connection, indirect connection through media, or internal connection between two components. A person having ordinary skill in the art can understand the specific meanings of the above terms in present invention in specific cases.

Furthermore, terms "input", "output", "feedback", "formation", etc. should be should be understood as describing an optical, electrical change or optical, electrical processing. For example, formation refers only to optical or electrical changes that occur after an optical or electrical signal passes through the component, instrument, or device, so that the optical signal or the electrical signal is processed, thereby obtaining the required signal for implementing technical solution or solving technical issue.

To better and more clearly describe the working principles of each components in the insertion type ultrasonic flow meter and flow measuring system in the drawings of the embodiments of present invention, the connection relationships presented on various parts of the device are only to distinguish the relative positional relationships between components, not to limit the directions of optical path, orders of connection or the sizes, dimensions or shapes of parts, components or structures.

First Embodiment

FIG. 1 represents an embodiment of an insertion type ultrasonic flow meter used on pipeline 300. The insertion type ultrasonic flow meter comprises first insertion type sensor 100, second insertion type sensor 200, first hot tapping saddle 140 and second hot tapping saddle 240. The first insertion type sensor 100 is equipped with first ultrasonic transducer 120 and the second insertion type sensor 200 is equipped with second ultrasonic transducer 220. The first insertion type sensor 100 and the second insertion type sensor 200 are installed at upstream and downstream of the pipeline 300 respectively. The first ultrasonic transducer 120 and the second ultrasonic transducer 220 are installed face to face. In the present embodiment, the imaginary line between the first ultrasonic transducer 120 and the second ultrasonic transducer 220 is parallel or at a certain angle with the pipeline 300 central axis. In the present embodiment, which is preferred, the first insertion type sensor 100 and the second insertion type sensor 200 have rigid connection with fixed relative position that will not change due to installation, which ensure all functions of the insertion type ultrasonic flow meter such as sensor zero, meter factor and system performance are fixed and will not change due to installation.

In the present embodiment, the first insertion type sensor 100 is connected and fixed to the pipeline 300 through the first hot tapping saddle 140; the second insertion type sensor 200 is connected and fixed to the pipeline 300 through the second hot tapping saddle 240. In the present embodiment, the first insertion type sensor 100 and the second insertion type sensor 200 can be installed hot, through the first hot tapping saddle 140 and the second hot tapping saddle 240 respectively, with a certain spacing upstream and downstream of the pipeline 300. Understandably, the fluid in pipeline 300 moves from upstream to downstream of pipeline 300, so the upstream and downstream of pipeline 300 do not have to be the ends of pipeline 300, which means they can be any two points or sections that are distributed along the direction of the flow.

In the present embodiment, the first ultrasonic transducer 120 and the second ultrasonic transducer 220 are components capable of converting high frequency electrical energy into mechanical energy using a piezoelectric effect, the main structure of which is piezoelectric ceramic. By inputting a certain voltage to the first ultrasonic transducer 120 and the second ultrasonic transducer 220 installed through the transmission lines installed on the first insertion type sensor 100 and the second insertion type sensor 200, can the first ultrasonic transducer 120 or the second ultrasonic transducer 220 send ultrasonic wave in the vibration direction of piezoelectric ceramic disc surface.

In the present embodiment, because the first ultrasonic transducer 120 and the second ultrasonic transducer 220 are installed face to face, understandably, the ultrasonic signal sent by the first ultrasonic transducer 120 is received by the second ultrasonic transducer 220; on the other hand, the ultrasonic signal sent by the second ultrasonic transducer 220 is received by the first ultrasonic transducer 120. The transmission and reception of ultrasonic signals are performed by the pair of transducers alternately. A matching ultrasonic channel is formed between the two transducers to achieve the accurate measurement of transit time and time difference between upstream to downstream and downstream to upstream.

In the present embodiment, the first ultrasonic transducer 120 and the second ultrasonic transducer 220 can be installed on the central axis of pipeline 300, or on an axis that apart from but parallel to the central axis of pipeline 300. Understandably, to achieve best ultrasonic measurement performance, the imaginary line between the first ultrasonic transducer 120 and the second ultrasonic transducer 220 should be parallel to the central axis of pipeline 300, where the ultrasonic channel between the pair of transducers is also parallel to the central axis of pipeline 300. Understandably, now the direction of the ultrasonic signal transmission in the ultrasonic channel is on the same line as the direction of flow in pipeline 300, so the transmission noise is the smallest, the signal quality is the highest, and the obtained data is more accurate, which provides guarantee for accurate measurement of low flow velocity and flow rate of water.

In particular, between the first ultrasonic transducer 120 and the second ultrasonic transducer 220 in the present embodiment can also be installed at different height in pipeline 300. For example, one up one down or one left one right installed tilted. The projection of tilted ultrasonic channel on the central axis of pipeline 300 or a line parallel to the central axis can be used as actual ultrasonic channel. The flow velocity and flow rate through the two cross sections where the two transducers are located can be obtained by converting the measured data to the corresponding conversion.

In the present embodiment, to ensure the relative fixed position between the first insertion type sensor 100 and the second insertion type sensor 200, the first hot tapping saddle 140 and the second hot tapping saddle 240 can be preformed into one piece or connected and fixed by saddle connecting piece shown in FIG. 1, such as lower connecting beam 400. In particular, the first insertion type sensor 100 and the second insertion type sensor 200 can also be reinforced on the top with upper connecting beam 420.

In present invention, the insertion type ultrasonic flow meter also comprises first ball valve 142 and second ball valve 242, where the first ball valve 142 is connected and fixed to the first hot tapping saddle 140 through thread or flange; the second ball valve 242 is connected and fixed to the second hot tapping saddle 240 through thread or flange. The inner diameters of the first ball valve 142 and the first hot tapping saddle 140 are larger than the inner diameter of the first insertion type sensor 100, so the first insertion type sensor 100 can pass through the first ball valve 142 and the first hot tapping saddle 140 smoothly; similarly, the inner diameters of the second ball valve 242 and the second hot tapping saddle 240 are larger than the inner diameter of the second insertion type sensor 200, so the second insertion type sensor 200 can pass through the second ball valve 242 and the second hot tapping saddle 240 smoothly.

In the present embodiment, the insertion type ultrasonic flow meter comprises a first rod locking piece 144 and a second rod locking piece 244, where the first insertion type sensor 100 is connected and fixed by the first rod locking piece 144 and the first ball valve 142; the second insertion type sensor 200 is connected and fixed by the second rod locking piece 244 and the second ball valve 242. By having ball valves and rod locking pieces, the insertion type sensors can be fixed on the hot tapping saddles firmly, which further increases the stability of the overall structure of flow meter. Preferred, in the present embodiment, waterproof sealing is used where hot tapping saddles, ball valves, rods of insertion type sensors and rod locking pieces meet.

In the present embodiment, to help locating the hot tapping saddles on pipeline 300 during installation, so the saddle axes are consistent with pipeline 300 axis, the first hot tapping saddle 140 and the second hot tapping saddle are equipped with an axial indicator, where the axial indicator is parallel to the central axis of the pipeline 300.

In the present embodiment, to ensure the first ultrasonic transducer 120 and the second ultrasonic transducer 220 on the first insertion type sensor 100 and the second insertion type sensor 200 can be installed face to face accurately, the depths the first insertion type sensor 100 and the second insertion type sensor 200 are inserted in pipeline 300 should be the same, which can be achieved by having preset scales or grooves on the first insertion type sensor 100 and the second insertion type sensor 200. Meanwhile, the orientation of the two insertion type sensors should also be strictly controlled to make the first insertion type sensor 100 and the second insertion type sensor 200 as parallel as possible, which can also be achieved by having grooves on insertion type sensors. Understandably, other structural components with positioning capabilities can also be used on the first insertion type sensor 100 and the second insertion type sensor 200 to make the insertion type sensor installation more precise.

In the present embodiment, temperature sensor 500 and pressure sensor 600 can also be installed on the first insertion type sensor 100 and the second insertion type sensor 200 to obtain water pressure and temperature data within the measurement environment for corresponding error compensation calculation when obtaining the ultrasonic signal transmission time difference.

To be noticed that, in the present embodiment, the relative distance and position between the first insertion type sensor 100 and the second insertion type sensor 200 can be fixed into a rigid structure at factory, e.g. by the upper connecting beam 420, which ensure the relative position between the first ultrasonic transducer 120 and the second ultrasonic transducer 220 will not change due to the possible errors in installation. Therefore, as a rigid structure, the system performance and meter factor of the insertion type ultrasonic flow meter can be calibrated in factory and will not change due to installation, which make the overall structure of flow meter more stable and the measurement result more reliable.

Figure 2:
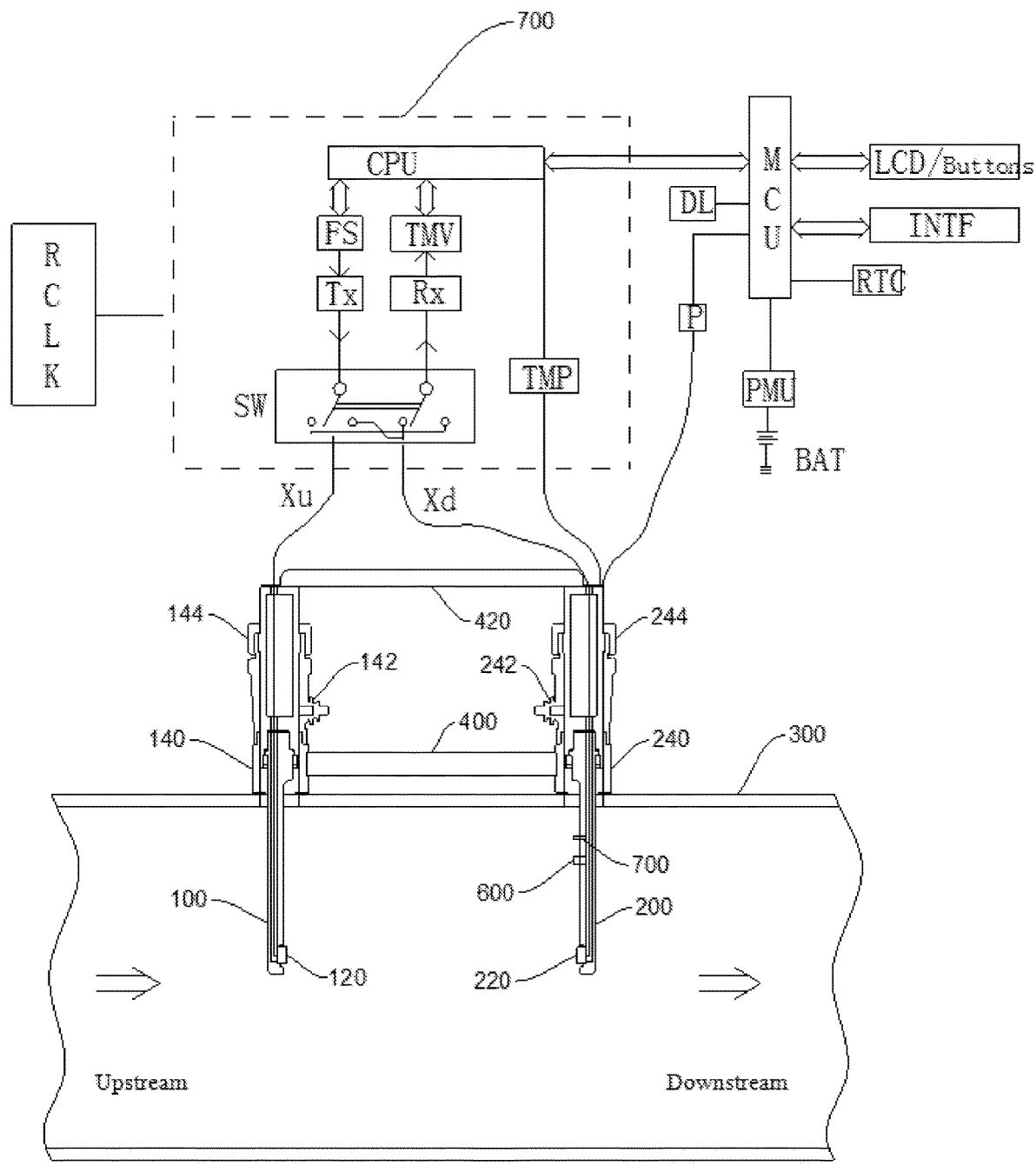
FIG. 2 is a schematic of the flow measuring system provided by the first embodiment of present invention.

Referring to FIG. 2, the present embodiment also provides a flow measuring system, comprising the insertion type ultrasonic flow meter described above, time difference measuring unit 700, reference time unit, microcontroller unit MCU, LCD/Buttons unit, interface unit INTF, external data storage unit DL, real time clock unit RTC, and power management unit PMU. The time difference measuring unit 700 and the microcontroller unit MCU are connected respectively to the insertion ultrasonic flow meter. The reference time unit and the microcontroller unit MCU are connected respectively to the time difference measuring unit 700. The LCD/Buttons unit, the interface unit INTF, the external data storage unit DL, the real time clock unit RTC and the power management unit PMU are connected respectively to the microcontroller unit MCU.

In the present embodiment, when the first insertion type sensor 100 or the second insertion type sensor 200 of the insertion type ultrasonic flow meter is also equipped with temperature sensor 500 and pressure sensor 600, the flow measuring system can also have temperature measuring unit TMP and pressure measuring unit P respectively. The temperature measuring unit TMP is connected to the time difference measuring unit 700. The pressure measuring unit P is installed on the first insertion type sensor 100 or the second insertion type sensor 200 of the insertion type ultrasonic flow meter, where the pressure measuring unit P is connected to the microcontroller unit MCU.

Usually, the temperature measuring unit TMP can be achieved in the time difference measuring unit 700; the pressure measuring unit P can be hung on the A/D converter.

In the present embodiment, the time difference measuring unit 700 can be a chip based on the ToF, Time of Flight, method that measure single propagation time, such as GP21/20/30 of ACAM, MAX35101 of MAXIM, etc.; or a product based on acoustic cycle method, e.g. D-FLOW solution; or build a solution based on the wiring diagram in FIG. 2. The interface unit INTF can be wireless interface, RS485 interface, MBUS interface, pulse interface, etc.

In the present embodiment, the power management unit PMU can convert battery voltage to various required voltage. Besides, it is also responsible for managing various power modes to minimize system power consumption and increase battery life.

In the present embodiment, the reference time unit provides the time difference measuring unit 700 accurate and stable reference frequencies, which ensure time difference measurement accuracy. The real time clock unit RTC provides the system basic clock and calendar, which is important for data logging.

In the present embodiment, the external data storage unit DL, optional E²PROM, Electrically Erasable Programmable Read Only Memory, is usually used to store various flow rate and status data, including daily total, daily maximum/minimum flow rate, monthly total, alarms, etc. These data can be stored in E²PROM for decades without power. In particular, the external data storage unit DL can be used for billing and other applications.

In the present embodiment, the temperature sensor 500 can be used to obtain water temperature to compensate the effect of water temperature on measurement accuracy. The pressure sensor 600 can be used to obtain pressure information at its location in pipeline 300, which is significant to the pressure balance of pipe network, prevention of pipe burst, reduction of water leakage and saving of pump energy consumption.

The insertion type ultrasonic flow meter provided by the present embodiment uses unique face-to-face insertion type sensors with the advantages of strong signal receiving capability, easy installation, stable and reliable structure, low material and maintenance costs. The flow measuring system implements battery power through the battery management unit PMU, and achieves accurate measurement of low flow velocity can flow rate of water in pipeline 300 through the time difference measuring unit 700 made of low power high precision large scale integrated circuits, which effectively solves the problem of power supply and low flow velocity detection in urban water pipe network projects, provides possibility of environmentally friendly and energy-saving water supply system management.

Second Embodiment

Figure 3:
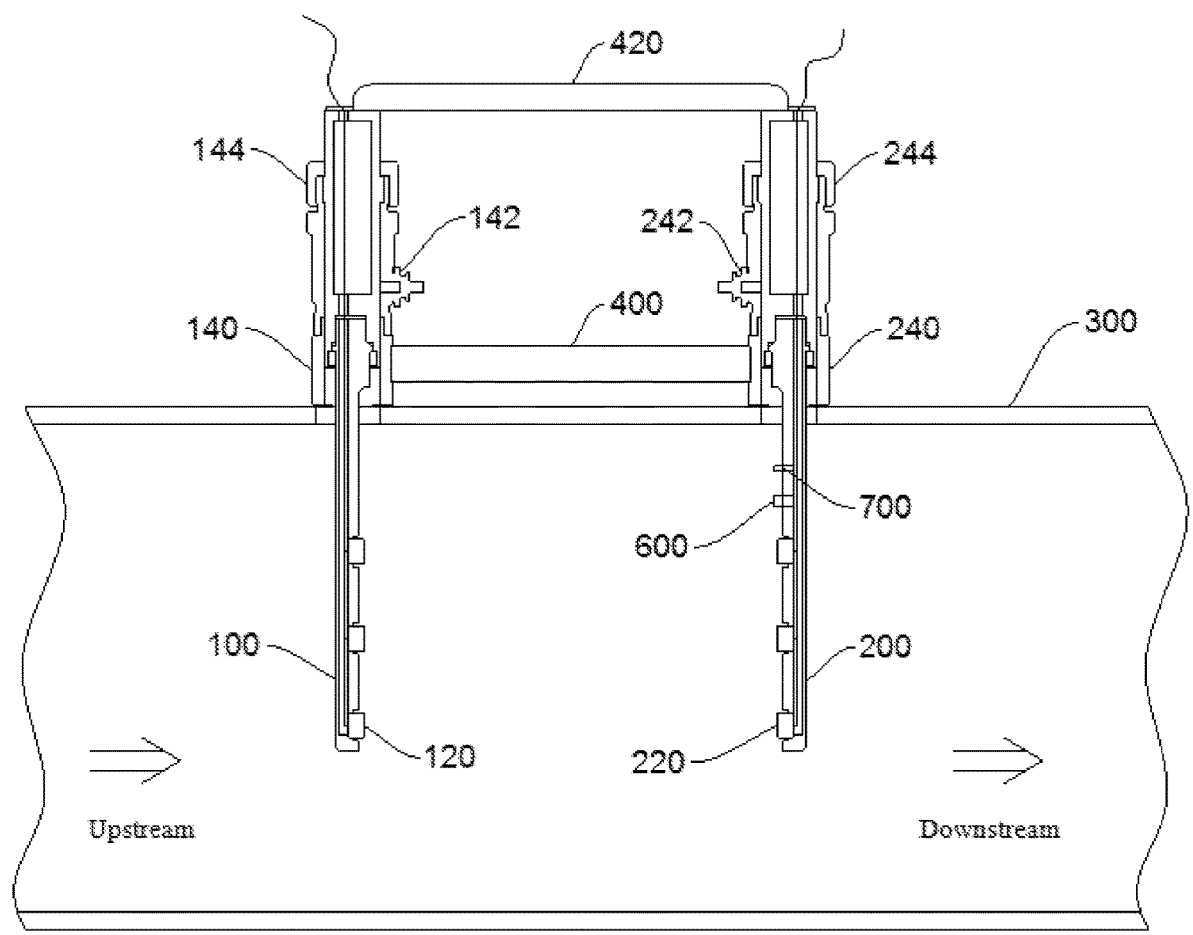
FIG. 3 is a schematic of the insertion type ultrasonic flow meter provided by the second embodiment of present invention.

FIG. 3 represents an embodiment of an insertion type ultrasonic flow meter. The biggest difference from the first embodiment of the present invention is that, in the present embodiment, the first insertion type sensor 100 of the insertion type ultrasonic flow meter has multiple ultrasonic transducers installed at different heights in the pipeline 300; the second insertion type sensor 200 is equipped with same amount of ultrasonic transducers at corresponding locations as the first insertion type sensor 100. Each pair of corresponding ultrasonic transducers on the first insertion type sensor 100 and the second insertion type sensor 200 forms an ultrasonic channel; the imaginary line which locates on is parallel to the central axis of pipeline 300.

Figure 4:
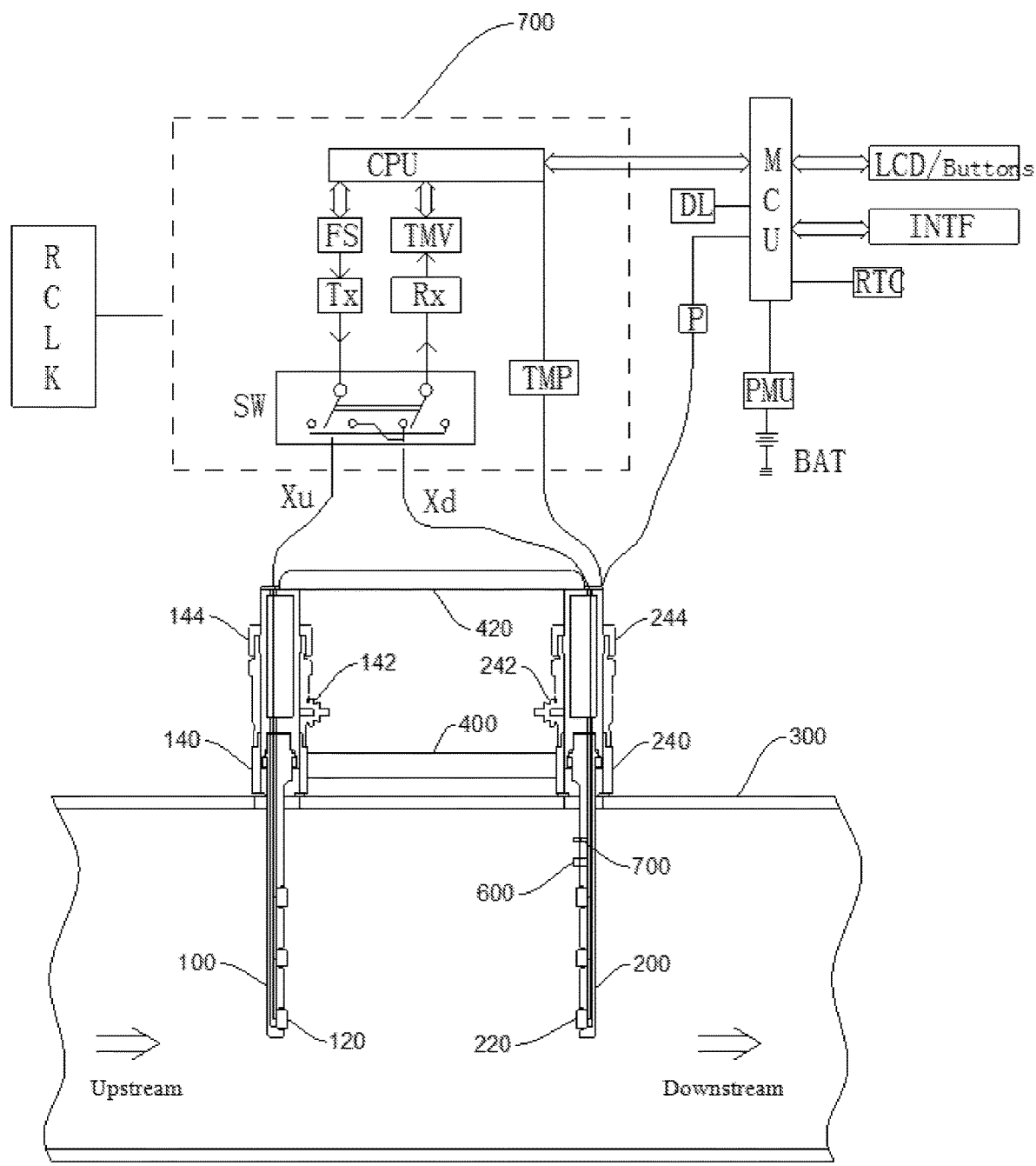
FIG. 4 is a schematic of the flow measuring system provided by the second embodiment of present invention.

Referring to FIG. 4, the present embodiment also provides a flow measuring system. The biggest difference from the first embodiment of the present invention is that, in the present embodiment, the time difference measuring unit 700 is also equipped with multichannel transfer switch at sensor accessing terminal, which can measure each ultrasonic channel individually of multichannel sensor.

Comparing to the first embodiment of the present invention, the present embodiment adds multiple pairs of transducers at different heights of the insertion type sensors to form multiple ultrasonic channels, where each ultrasonic channel measures ultrasonic transit time difference individually. It obtains multiple groups of data at different heights in pipeline 300 to get a more accurate result of flow velocity and flow rate.

Third Embodiment

Figure 5:
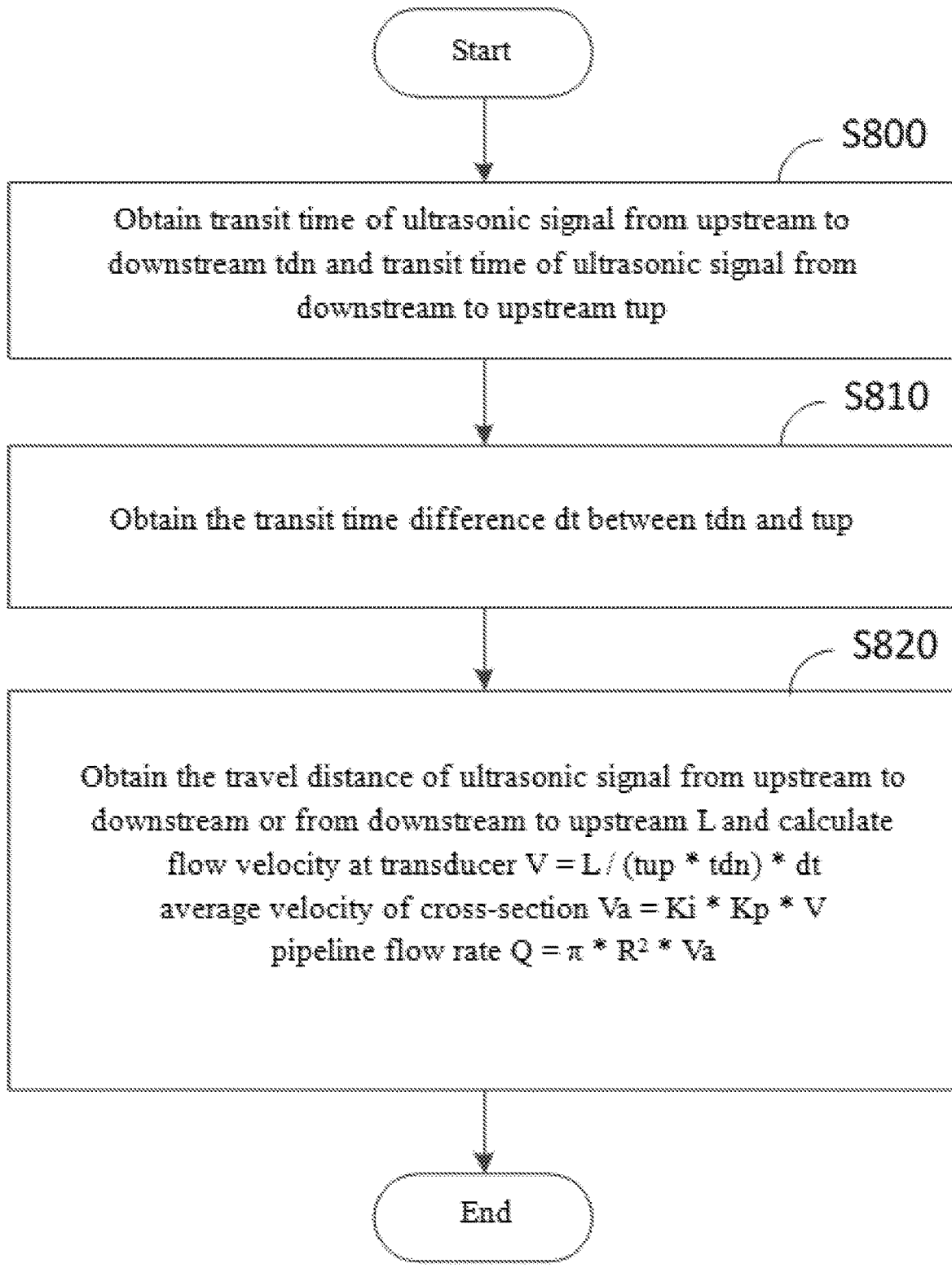
FIG. 5 is a flow chart of the flow measuring method provided by the third embodiment of present invention.

FIG. 5 represents an embodiment of a flow measuring method, which is applied to the flow measurement system in the first embodiment or the second embodiment of the present invention, comprising:

Step S800: Obtain transit time of ultrasonic signal from upstream to downstream tdn and transit time of ultrasonic signal from downstream to upstream tup;

Step S810: Obtain the transit time difference dt between tdn and tup;

Step S820: Obtain the travel distance of ultrasonic signal from upstream to downstream or from downstream to upstream L and calculate Flow velocity at transducer $V=L/(tup*tdn)*dt$, Average velocity of cross-section $Va=Ki*Kp*V$, Pipeline flow rate $Q=\pi*R^2*Va$, Where Kp is flow rate profile factor, Kc is meter scale factor and R is radius of pipeline.

The flow measuring method provided by the present embodiment calculate the flow velocity of fluid at the transducers based on the measured time difference and the spacing between transducers; then according to the principle of fluid mechanics, calculate the average flow velocity of cross-section and pipeline flow rate based on the flow velocity at transducer, accomplishing the accurate measurement of flow velocity and flow rate.

In summary, the insertion type ultrasonic flow meter, flow measuring system and method, by installing the first insertion type sensor and the second insertion type sensor at the upstream and downstream of the pipeline respectively, and equipping the first ultrasonic transducer and the second ultrasonic transducer on the first insertion type sensor and the second insertion type sensor respectively, can form a flow rate measuring ultrasonic channel able to adjust location and spacing upon requirement. The two ends of the ultrasonic channel are at the same height in the pipeline, improving the transmission quality of ultrasonic signal, making it easy to accurately measure the flow velocity at the same height in the pipeline. Comparing to prior art, the insertion type ultrasonic flow meter provided by the present invention has stronger signal receiving capability and less channel noise, which greatly simplify the hardware structure of flow meter and decrease the system power consumption, so it can be powered by battery. Meanwhile, because of better signal quality, the system has higher accuracy on measurement of ultrasonic transit time. Also, because the first ultrasonic transducer and the second ultrasonic transducer are installed face to face, the accuracy and low flow velocity measuring capability of the flow measuring system are guaranteed to achieve accurate measurement of low flow velocity and flow rate of water in pipeline. The descriptions above are only preferred embodiments of the present invention and are not intended to limit the scope of the claims. Various changes and modifications can be made to the invention by those having ordinary skill in the art. Any modifications, equivalent substitutions, improvements, etc., made within the spirit and scope of the present invention, are intended to be included within the scope of the present invention.

What is claimed is:

1. An insertion type ultrasonic flow meter adapted to be installed onto a pipeline, the pipeline having a central axis, the insertion type ultrasonic flow meter comprising:
    (a) a first insertion type sensor equipped with a first ultrasonic transducer; and
    (b) a second insertion type sensor equipped with a second ultrasonic transducer;
    (c) wherein the first insertion type sensor and the second insertion type sensor are adapted to be installed at upstream and downstream of the pipeline, the first and second insertion type sensors being mechanically coupled together outside the pipeline so as to be maintained a fixed distance apart from one another;
    (d) wherein the first ultrasonic transducer and the second ultrasonic transducer are adapted to be installed within the pipeline so as to define an ultrasonic channel therebetween, the ultrasonic channel being a straight line that lies in parallel to the central axis of the pipeline.

2. The insertion type ultrasonic flow meter of claim 1, wherein the first insertion type sensor is equipped with multiple ultrasonic transducers which are adapted to be installed at a first set of different heights in the pipeline wherein the second insertion type sensor is equipped with same amount of multiple ultrasonic transducers which are adapted to be installed at a second set of different heights that is the same as the first set of different heights for the first insertion type sensor.

3. The insertion type ultrasonic flow meter of claim 1, further comprising a first hot tapping saddle and a second hot tapping saddle, where the first insertion type sensor is adapted to be connected and fixed to the pipeline through the first hot tapping saddle and the second insertion type sensor is adapted to be connected and fixed to the pipeline through the second hot tapping saddle.

4. The insertion type ultrasonic flow meter of claim 3, further comprising a connecting beam, by which the first hot tapping saddle and the second hot tapping saddle are directly connected outside the pipeline and thereby maintained a fixed distance apart from one another.

5. The insertion type ultrasonic flow meter of claim 3, wherein both the first hot tapping saddle and the second hot tapping saddle are equipped with an axial indicator.

6. The insertion type ultrasonic flow meter of claim 1, wherein both the first insertion type sensor and the second insertion type sensor have at least one of scales and grooves to facilitate insertion of the first insertion type sensor and the second insertion type sensor at the same depth into the pipeline.

7. An insertion type ultrasonic flow meter adapted to be installed onto a pipeline, the insertion type ultrasonic flow meter comprising:
    (a) a first insertion type sensor equipped with a first ultrasonic transducer, the first insertion type sensor having an inner diameter;
    (b) a second insertion type sensor equipped with a second ultrasonic transducer, the second insertion type sensor having an inner diameter, wherein the first insertion type sensor and the second insertion type sensor are adapted to be installed upstream and downstream of the pipeline such that the first ultrasonic transducer and the second ultrasonic transducer are face to face;
    (c) a first hot tapping saddle and a second hot tapping saddle, wherein the first insertion type sensor is adapted to be connected and fixed to the pipeline through the first hot tapping saddle and the second insertion type sensor is adapted to be connected and fixed to the pipeline through the second hot tapping saddle; and
    (d) a first ball valve and a second ball valve, wherein the first ball valve is connected and fixed to the first hot tapping saddle through at least one of a thread and a flange, wherein the second ball valve is connected and fixed to the second hot tapping saddle through at least one of a thread and flange, each of the first ball valve and the first hot tapping saddle having a diameter that is larger than the inner diameter of the first insertion type sensor, each of the second ball valve and the second hot tapping saddle having a diameter that is larger than the inner diameter of the second insertion type sensor.

8. The insertion type ultrasonic flow meter of claim 7 further comprising a first rod locking piece and a second rod locking piece, where the first insertion type sensor is connected and fixed by the first rod locking piece and the first ball.

9. A flow measuring system comprising an insertion type ultrasonic flow meter adapted to be installed onto a pipeline, the insertion type ultrasonic flow meter comprising:
    (a) a first insertion type sensor equipped with a first ultrasonic transducer, the first insertion type sensor having an inner diameter;
    (b) a second insertion type sensor equipped with a second ultrasonic transducer, the second insertion type sensor having an inner diameter, wherein the first insertion type sensor and the second insertion type sensor are adapted to be installed upstream and downstream of the pipeline such that the first ultrasonic transducer and the second ultrasonic transducer are face to face; and
    (c) a time difference measuring unit, a reference time unit, a microcontroller unit (MCU), an LCD/Buttons unit, an interface unit (INTF), and external data storage unit (DL), a real time clock unit (RTC), and a power management unit PMU;

(d) wherein each of the time difference measuring unit and the microcontroller unit is connected to the insertion ultrasonic flow meter, each of the reference time unit and the microcontroller unit is connected to the time difference measuring unit, each of the LCD/Buttons unit, the interface unit, the external data storage unit, the real time clock unit, and the power management unit is connected to the microcontroller unit, wherein the time difference measuring unit is equipped with a multichannel transfer switch at a sensor accessing terminal.

10. The flow measuring system of claim 9 further comprising a temperature sensor, a pressure sensor, a temperature measuring unit TMP and a pressure measuring unit P, wherein the temperature sensor is located on the first insertion type sensor and the second insertion type sensor of the insertion type ultrasonic flow meter, wherein the temperature measuring unit TMP is connected to the time difference measuring unit, wherein the pressure sensor is located on the first insertion type sensor and the second insertion type sensor of the insertion type ultrasonic flow meter, wherein the pressure measuring unit P is connected to the microcontroller unit MCU.

11. A flow measuring method, applied to the flow measuring system described by claim 9, the method comprising the steps of, obtaining a transit time of an ultrasonic signal from upstream to downstream tdn and a transit time of an ultrasonic signal from downstream to upstream tup;

obtaining a transit time difference dt between tdn and tup;

obtaining a the travel distance of an ultrasonic signal from upstream to downstream L and calculate a flow velocity at transducer V=L/(tup*tdn)*dt.

* * * * *